(12) United States Patent
Wu et al.

(10) Patent No.: US 11,224,213 B2
(45) Date of Patent: Jan. 18, 2022

(54) COMBINED TYPE MOUSE-STOPPING DEVICE CAPABLE OF ADJUSTING THE TILT ANGLE

(71) Applicant: Ningxia Jinbole Food Technology Co., Ltd., Ningxia (CN)

(72) Inventors: Yuzhu Wu, Ningxia (CN); Xingyue Wu, Ningxia (CN); Zhen Yang, Ningxia (CN); Liming Zhou, Ningxia (CN); Jingtao Ma, Ningxia (CN); Caixia Hao, Ningxia (CN)

(73) Assignee: Ningxia Jinbole Food Technology Co., Ltd., Wuzhong (CN)

( * ) Notice: Subject to any disclaimer, the term of this patent is extended or adjusted under 35 U.S.C. 154(b) by 0 days.

(21) Appl. No.: 16/840,417

(22) Filed: Apr. 5, 2020

(65) Prior Publication Data
US 2020/0229422 A1    Jul. 23, 2020

(51) Int. Cl.
*A01M 29/30* (2011.01)
*E06B 7/28* (2006.01)
*E04B 1/72* (2006.01)

(52) U.S. Cl.
CPC ............. *A01M 29/30* (2013.01); *E04B 1/72* (2013.01); *E06B 7/28* (2013.01)

(58) Field of Classification Search
CPC .. A01M 29/30; E04B 1/72; E06B 7/32; E06B 9/04
See application file for complete search history.

(56) References Cited

U.S. PATENT DOCUMENTS

| | | | | |
|---|---|---|---|---|
| 4,351,247 A * | 9/1982 | Clark | ......................... | E06B 7/32 109/11 |
| 5,832,666 A * | 11/1998 | Flack, II | ................... | E06B 9/04 49/67 |
| 7,444,783 B1 * | 11/2008 | Hansen | ................. | A01M 29/30 49/131 |
| 8,246,272 B1 * | 8/2012 | Heitz | ........................ | E06B 9/04 405/92 |
| 2004/0040230 A1 * | 3/2004 | Taegar | ...................... | E06B 9/04 52/202 |
| 2004/0216650 A1 * | 11/2004 | Lee | ............................ | E06B 7/32 109/19 |
| 2010/0043298 A1 * | 2/2010 | Anhamm | ................. | A62C 2/06 49/383 |
| 2012/0034032 A1 * | 2/2012 | Waters, Jr. | .............. | E02B 3/104 405/92 |
| 2019/0078369 A1 * | 3/2019 | Stover | ........................ | E05F 1/10 |
| 2019/0323284 A1 * | 10/2019 | Losik, Jr. | ............. | A01K 15/006 |

* cited by examiner

*Primary Examiner* — Gisele D Ford

(57) ABSTRACT

This invention provides a tilt angle adjustable combined rat-proof device, relating to the technical field of rat-proof devices. A rat-proof device includes a rat-proof plate body, a fixing mechanism and an adjusting mechanism, wherein the rat-proof plate body is inserted into the fixing mechanism so that the rat-proof plate body is able to be clamped, and an upper end of the fixing mechanism is clamped into the adjusting mechanism and is able to slide along the adjusting mechanism so as to drive the rat-proof plate body to move, thereby realizing adjustment of the tilt angle of rat-proof plate body. The device can adjust the tilt angle based on the user's actual requirements, therefore adapting to the use environment, and it is also extremely convenient in the process of transportation, disassembly and installation.

11 Claims, 7 Drawing Sheets

COMBINED TYPE MOUSE-STOPPING DEVICE CAPABLE OF ADJUSTING THE TILT ANGLE

CROSS-REFERENCE TO RELATED APPLICATIONS

The present application claims priority from Chinese application No. 201920276505.9 entitled A tilt angle adjustable combined rat-proof device and filed on Mar. 5, 2019, Chinese application No. 201920275896.2 entitled A tilt angle adjustable folding rat-proof device and filed on Mar. 5, 2019, and Chinese application No. 201920275901.X entitled A curved rat-proof plate and filed on Mar. 5, 2019 which are hereby incorporated by reference in their entireties.

FIELD OF TECHNOLOGY

The present invention relates to the technical field of rat-proof devices, specifically relates to a rat-proof device, in particular to a tilt angle adjustable combined rat-proof device.

BACKGROUND

A rat-proof plate is mainly used for preventing small animals such as rats from entering the room, and to damage the indoor equipment, articles and electrical equipment.

Traditional rat-proof plate mainly adopts an integral structure, but it can only be suitable for doors of the same size. For doors of different sizes, a rat-proof plate needs to be manufactured according to the size of the door, and if a rat-proof plate of a certain size is no longer used, it cannot be mounted on doors of other sizes, resulting in a waste of resources, so that the mounting cost is increased. Also, integral rat-proof plate is extremely inconvenient in the process of transportation, disassembly and installation, and the angle of the rat-proof plate cannot be adjusted based on actual requirements during use.

SUMMARY

The purpose of the present invention is to provide a tilt angle adjustable combined rat-proof device.

A tilt angle adjustable combined rat-proof device, including a rat-proof plate body, a positioning rod, a fixing mechanism and an adjusting mechanism, wherein a lower end of the fixing mechanism is fixed with ground through bolts, and the fixing mechanism is located on both sides of the rat-proof plate body; the rat-proof plate body is inserted into the fixing mechanism so that the rat-proof plate body is clamped by the fixing mechanism; the positioning rod is embedded into the rat-proof plate body to fix the rat-proof plate body, and the adjusting mechanism is fixed to a wall body through bolts; an upper end of the fixing mechanism is clamped into the adjusting mechanism and is able to slide along the adjusting mechanism so as to drive the rat-proof plate body to move, thereby realizing adjustment of an title angle; the rat-proof plate body includes a first baffle plate and a second baffle plate, wherein a bump is disposed on two side wall of the first baffle plate, and a concave groove is disposed on two sides of the second baffle plate which are in contact with surfaces of the side walls of the first baffle plate; a size of the concave groove is matched with that of the bump, and the bump is inserted into the concave groove so that the first baffle plate is connected with the second baffle plate; an embedding groove is disposed in one side surface of the first baffle plate and one side surface of the second baffle plate, wherein the positioning rod is clamped into the embedding groove, so the first baffle plate is fixed with the second baffle plate.

Preferably, the adjusting mechanism includes a locking pin and an angle adjustment member, and two ends of the angle adjustment member are fixedly provided with connecting lugs respectively, wherein circular holes for the bolts to pass through are formed in the connecting lugs; the bolts penetrating through the circular holes to fix the connecting lugs to the wall body; the angle adjustment member is internally provided with a slideway, and a long-bar-shaped hole is formed in a side surface, close to the fixing mechanism, of the angle adjustment member, wherein the long-bar-shaped hole is communicated with the slideway, and a size of the long-bar-shaped hole is smaller than that of the slideway; a mounting hole is formed in one end of the long-bar-shaped hole, and a positioning pin hole is formed in the side surface, close to the fixing mechanism, of the angle adjustment member, wherein the positioning pin hole is located above the long-bar-shaped hole; the locking pin penetrates through the fixing mechanism and is inserted into the positioning pin hole, thus the fixing mechanism is connected with the angle adjustment member.

Preferably, the fixing mechanism includes a fixing plate and a fixing base; a sliding wheel is fixedly arranged on a side surface, in contact with the angle adjustment member, of an upper end of the fixing plate, and a size of the sliding wheel is matched with that of the slideway and is smaller than that of the mounting hole; the sliding wheel is embedded in the slideway and is able to slide along the long-bar-shaped hole; two connecting plates are vertically and fixedly arranged on a side surface of the fixing plate, and the two connecting plates are oppositely arranged along a long axis of the fixing plate, thus a space between the two connecting plates is reserved so that the rat-proof plate body is able to insert into; a connecting column is fixedly arranged at ends, close to the ground, of the two connecting plates, wherein the connecting column is located on non-adjacent side surfaces of the connecting plate, and the fixing base is sleeved on the connecting column, therefor the fixing base is able to rotate circumferentially along the connecting column.

Preferably, the fixed base includes a first connection plate and a second connection plate, and the first connection plate is connected with the second connection plate by a pin shaft, wherein a sleeve hole is arranged on a surface of the first connection plate; the sleeve hole penetrates through the connecting column to connect the first connection plate with the connecting column; a bolt hole for the bolt to pass through is disposed on a surface of the second connection plate, and the bolt penetrates through the bolt hole to fix the second connection plate, thereby fixing the fixing base.

Preferably, the embedding groove and the positioning rod are all provided with positioning holes, and the bolts pass through the positioning holes to fix the positioning rod and the rat-proof plate body.

Preferably, a handle is fixedly disposed on upper end edges of the first baffle plate and the second baffle plate, which is located on one side surface of the embedding groove.

The benefits of the invention are as follows: the rat-proof device includes a rat-proof plate body, a positioning rod, a fixing mechanism and an adjusting mechanism, wherein a lower end of the fixing mechanism is fixed with ground through bolts, and the fixing mechanism is located on both sides of the rat-proof plate body; the rat-proof plate body is inserted into the fixing mechanism so that the rat-proof plate body is clamped by the fixing mechanism; the positioning rod is embedded into the rat-proof plate body to fix the rat-proof plate body, and the adjusting mechanism is fixed to a wall body through bolts; an upper end of the fixing mechanism is clamped into the adjusting mechanism and is able to slide along the adjusting mechanism so as to drive the rat-proof plate body to move, thereby realizing adjustment of a title angle of the rat-proof plate body, so a user is able to adjust the tilt angle of the rat-proof plate according to actual use requirements, thereby adapting to the use environment; the rat-proof plate body includes a first baffle plate and a second baffle plate, wherein a bump is disposed on two side wall of the first baffle plate, and a concave groove is disposed on two sides of the second baffle plate which are in contact with surfaces of the side walls of the first baffle plate; a size of the concave groove is matched with that of the bump, and the bump is inserted into the concave groove so that the first baffle plate is connected with the second baffle plate, so the user can select a suitable number of the first and the second baffle plates according to the size of the door, and assemble them into the rat-proof plate body, so that the size of the rat-proof plate body is matched with the size of the door, therefor the user does not need to customize the matched rat-proof plate for doors of different sizes, and only need to assemble the rat-proof plate body according to the size of the door when mounting position of the rat-proof device needs to be replaced; the device is extremely convenient to transport, disassemble and install.

The size of the concave groove is matched with that of the bump, and the bump is inserted into the concave groove so that the first baffle plate is connected with the second baffle plate; compared with the mode of using a latch plate and a hinge, the first baffle plate and the second baffle plate of this device are able to be seamlessly connected to prevent rats and the like from climbing through the gap.

Preferably, an upper half of the rat-proof plate is bent toward the side away from the fixing plate, and is away from the fixing mechanism in the same direction as the tilt angle.

There for, rats, snakes and other small animals can be efficiently blocked due to the fact that the upper half of the rat-proof plate is arranged in a curved surface.

The invention further provides a tilt angle adjustable combined rat-proof device, including a rat-proof plate body, a fixing mechanism and an adjusting mechanism, wherein a lower end of the fixing mechanism is fixed with ground through bolts, and the fixing mechanism is located on two sides of the rat-proof plate body; the rat-proof plate body is inserted into the fixing mechanism so that the rat-proof plate body is clamped and fixed by the fixing mechanism; the adjusting mechanism is fixed to a wall body through bolts; an upper end of the fixing mechanism is clamped into the adjusting mechanism and is able to slide along the adjusting mechanism so as to drive rat-proof plate body to move, thereby realizing adjustment of a tilt angle of the rat-proof plate body; the rat-proof plate body includes at least two rat-proof plates, and at least two rat-proof plates are successively connected to each other through a pin shaft, and at least two rat-proof plates have the same structure, where in the at least two rat-proof plates include baffle plates, a first rotating member and a second rotating member; a mounting groove is formed in one side surface of the baffle plates, and a magnetic hole for mounting the magnet is disposed at middle of a bottom of the mounting groove, wherein a size of the first rotating member is matched with that of the mounting groove, and the first rotating member is clamped into the mounting groove and is fixedly connected with the baffle plates by bolts; a gap is formed in the middle position of the first rotating member, and two side edges along opening direction of the gap is provided with a first sleeve; the second rotating member is fixed on one side surface of the baffle plates through bolts and is opposite to the first rotating member, wherein a size of the second rotating member is matched with that of the gap arranged on the first rotating member; the second rotating member is fixedly provided with a magnetic column head, and a size of the magnetic column head is matched with that of the magnetic hole, wherein one side edge of the second rotating member is fixedly provided with a second sleeve, and the pin shaft is inserted into the first sleeve and the second sleeve, thus connecting the baffle plates in sequence, and then the magnetic column head is inserted into the magnetic hole, so the magnetic column head and the magnetic hole attract each other, fixing the baffle plates.

Preferably, the adjusting mechanism includes a locking pin and an angle adjustment member, and two ends of the angle adjustment member are fixedly provided with connecting lugs respectively, wherein circular holes for the bolts to pass through are formed in the connecting lugs; the bolts penetrating through the circular holes to fix the connecting lugs to the wall body; the angle adjustment member is internally provided with a slideway, and a long-bar-shaped hole is formed in a side surface, close to the fixing mechanism, of the angle adjustment member, wherein the long-bar-shaped hole is communicated with the slideway, and a size of the long-bar-shaped hole is smaller than that of the slideway; a mounting hole is formed in one end of the long-bar-shaped hole, and a positioning pin hole is formed in the side surface, close to the fixing mechanism, of the angle adjustment member, wherein the positioning pin hole is located above the long-bar-shaped hole; the locking pin penetrates through the fixing mechanism and is inserted into the positioning pin hole, thus the fixing mechanism is connected with the angle adjustment member.

Preferably, the fixing mechanism includes a fixing plate and a fixing base; a sliding wheel is fixedly arranged on a side surface, in contact with the angle adjustment member, of an upper end of the fixing plate, and a size of the sliding wheel is matched with that of the slideway and is smaller than that of the mounting hole; the sliding wheel is embedded in the slideway and is able to slide along the long-bar-shaped hole; two connecting plates are vertically and fixedly arranged on a side surface of the fixing plate, and the two connecting plates are oppositely arranged along a long axis of the fixing plate, thus a space between the two connecting plates is reserved so that the rat-proof plate body is able to insert into; a connecting column is fixedly arranged at ends, close to the ground, of the two connecting plates, wherein the connecting column is located on non-adjacent side surfaces of the connecting plate, and the fixing base is sleeved on the connecting column, therefor the fixing base is able to rotate circumferentially along the connecting column.

Preferably, the fixed base includes a first connection plate and a second connection plate, and the first connection plate is connected with the second connection plate by a pin shaft, wherein a sleeve hole is arranged on a surface of the first connection plate; the sleeve hole penetrates through the connecting column to connect the first connection plate with the connecting column; a bolt hole for the bolt to pass through is disposed on a surface of the second connection plate, and the bolt penetrates through the bolt hole to fix the second connection plate, thereby fixing the fixing base.

Preferably, top surfaces of the baffle plates are fixedly provided with handles.

The benefits of the invention are as follows: the invention includes a rat-proof plate body, a fixing mechanism and an adjusting mechanism, wherein a lower end of the fixing mechanism is fixed with ground through bolts, and the fixing mechanism is located on two sides of the rat-proof plate body; the rat-proof plate body is inserted into the fixing mechanism so that the rat-proof plate body is clamped and fixed by the fixing mechanism; the adjusting mechanism is fixed to a wall body through bolts; an upper end of the fixing mechanism is clamped into the adjusting mechanism and is able to slide along the adjusting mechanism so as to drive rat-proof plate body to move, thereby realizing adjustment of a tilt angle of the rat-proof plate body, so a user is able to adjust the tilt angle of the rat-proof plate according to actual use requirements, thereby adapting to the use environment; the rat-proof plate body includes at least two rat-proof plates, and at least two rat-proof plates are successively connected to each other through a pin shaft, and at least two rat-proof plates have the same structure, wherein the at least two rat-proof plates include baffle plates, a first rotating member and a second rotating member; a mounting groove is formed in one side surface of the baffle plates, and a magnetic hole for mounting the magnet is disposed at middle of a bottom of the mounting groove, wherein a size of the first rotating member is matched with that of the mounting groove, and the first rotating member is clamped into the mounting groove and is fixedly connected with the baffle plates by bolts; a gap is formed in the middle position of the first rotating member, and two side edges along opening direction of the gap is provided with a first sleeve; the second rotating member is fixed on one side surface of the baffle plates through bolts and is opposite to the first rotating member, wherein a size of the second rotating member is matched with that of the gap arranged on the first rotating member; the second rotating member is fixedly provided with a magnetic column head, and a size of the magnetic column head is matched with that of the magnetic hole, wherein one side edge of the second rotating member is fixedly provided with a second sleeve, and the pin shaft is inserted into the first sleeve and the second sleeve, thus connecting the baffle plates in sequence, and then the magnetic column head is inserted into the magnetic hole, so the magnetic column head and the magnetic hole attract each other, fixing the baffle plates, so the user can select a suitable number of the baffle plates according to the size of the door, and assemble them into the rat-proof plate body, so that the size of the rat-proof plate body is matched with the size of the door, therefor the user does not need to customize the matched rat-proof plate for doors of different sizes, and only need to assemble the rat-proof plate body according to the size of the door; moreover, the user can fold the assembled rat-proof plate body, roll it up and roll it into a cylinder shape, so that the device is extremely convenient in the process of transportation and storage.

DESCRIPTION OF THE EMBODIMENTS

Figure 1:
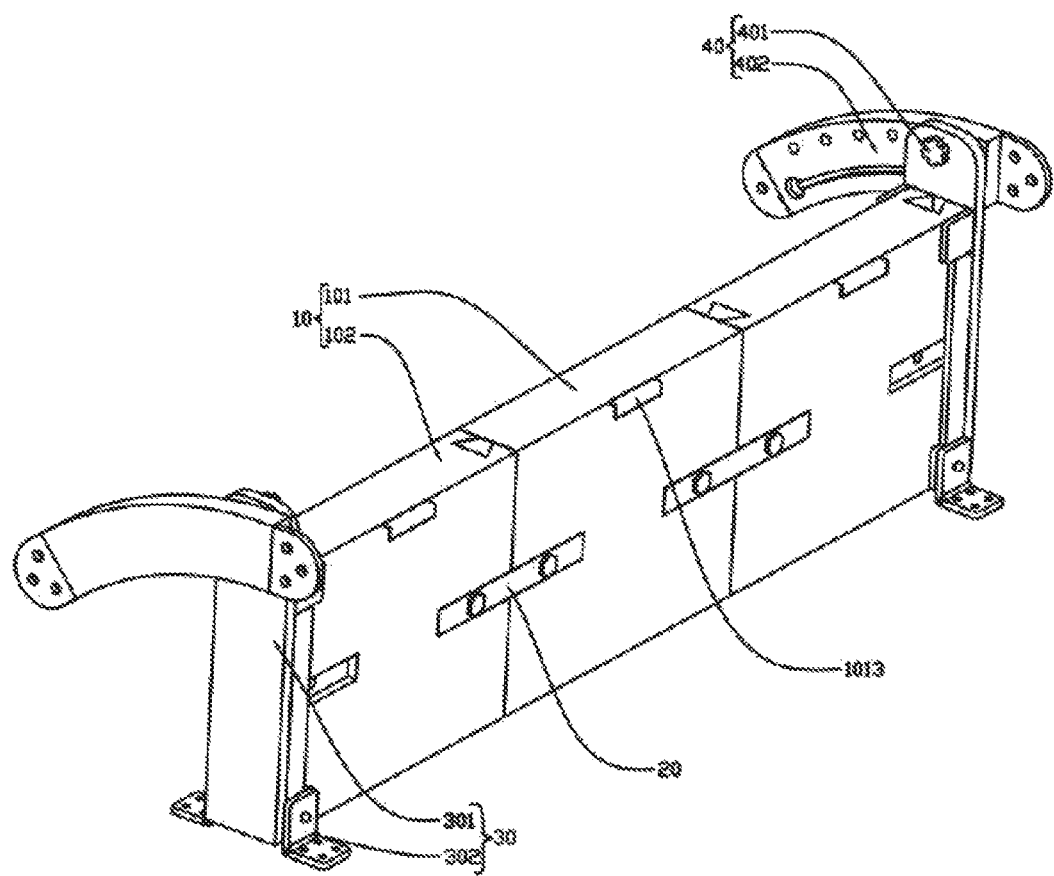
FIG. 1 is a schematic structural diagram of the rat-proof device according to an embodiment of the present invention.
Figure 2:
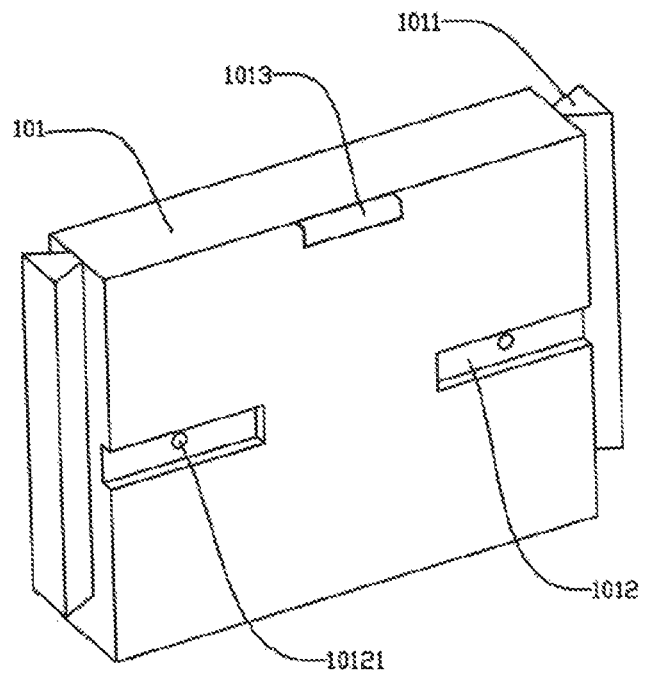
FIG. 2 is a schematic structural diagram of a first baffle plate of the rat-proof device according to an embodiment of the present invention.
Figure 3:
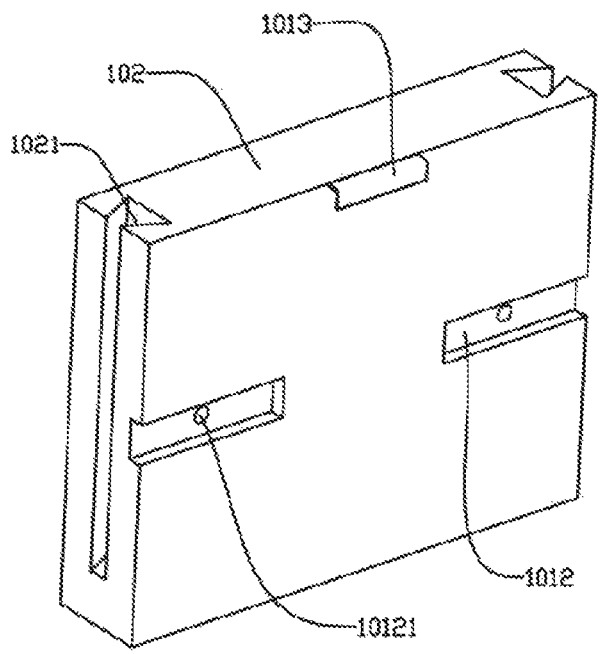
FIG. 3 is a schematic structural diagram of a second baffle plate of the rat-proof device according to an embodiment of the present invention.
Figure 4:
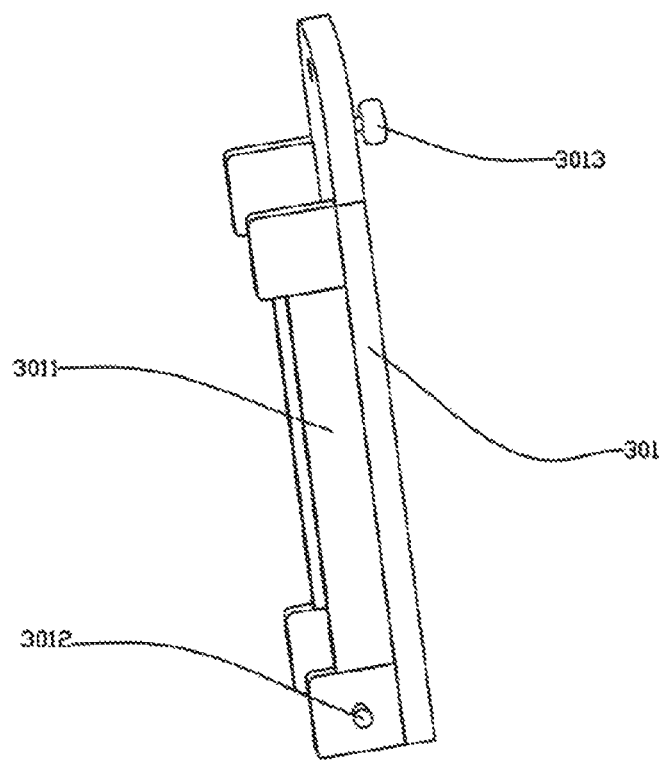
FIG. 4 is a schematic structural diagram of a fixing plate of the rat-proof device in FIG. 1.
Figure 5:
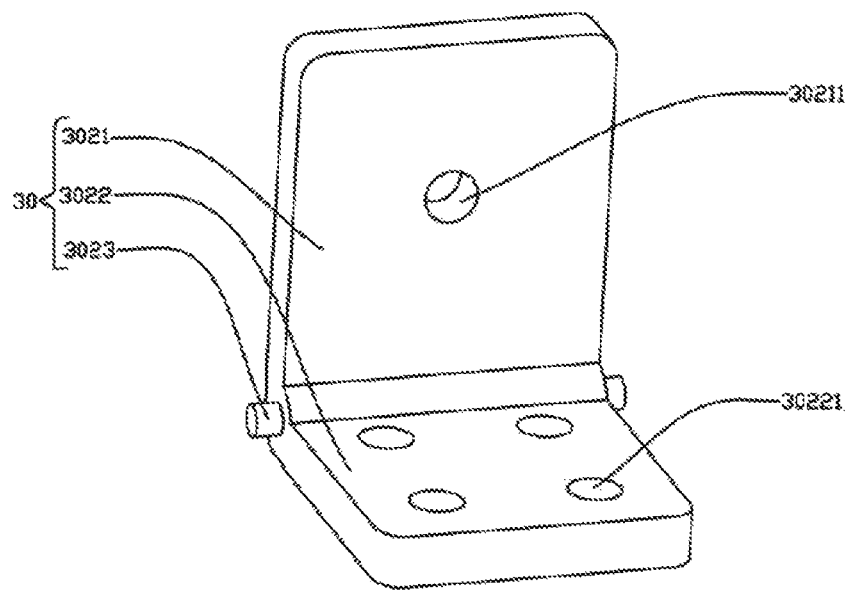
FIG. 5 is a schematic structural diagram of a fixing base of the rat-proof device in FIG. 1.
Figure 6:
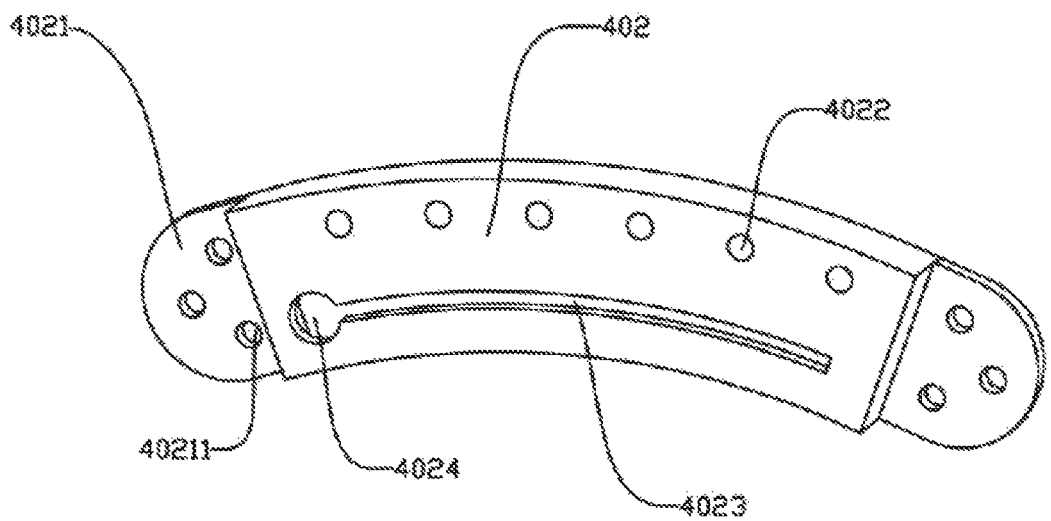
FIG. 6 is a schematic structural diagram of an angle adjustment member of the rat-proof device in FIG. 1.
Figure 7:
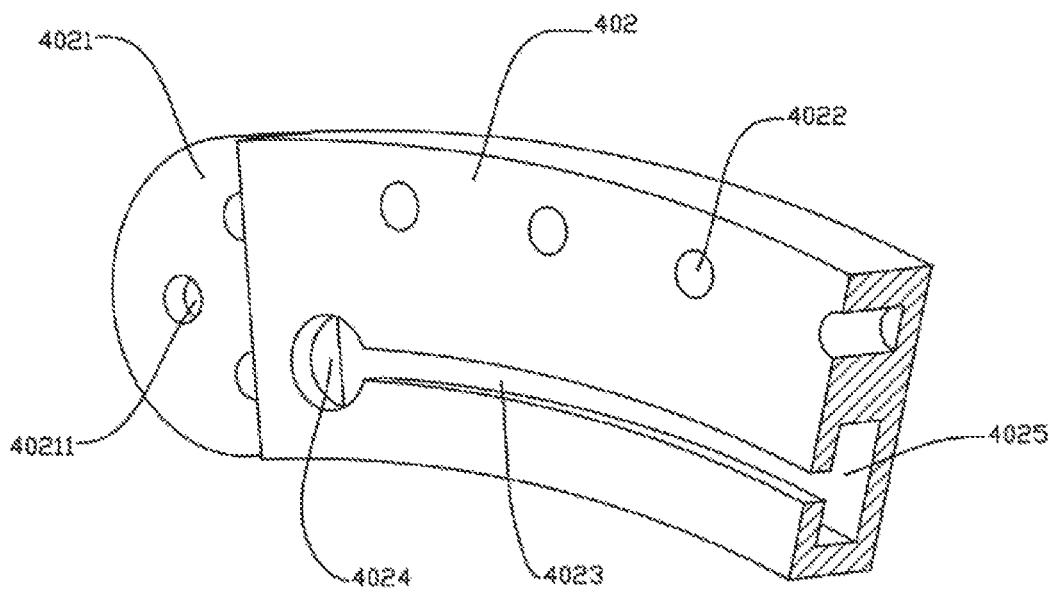
FIG. 7 is a schematic cross-sectional view of FIG. 6.

FIGS. 1-7 illustrate a tilt angle adjustable combined rat-proof device according to an embodiment of the present invention, including a rat-proof plate body 10, a positioning rod 20, a fixing mechanism 30 and an adjusting mechanism 40, wherein a lower end of the fixing mechanism 30 is fixed with ground through bolts, and the fixing mechanism 30 is located on both sides of the rat-proof plate body 10; the rat-proof plate body 10 is inserted into the fixing mechanism 30 so that the rat-proof plate body 10 is clamped by the fixing mechanism 30; the positioning rod 20 is embedded into the rat-proof plate body 10 to fix the rat-proof plate body 10, and the adjusting mechanism 40 is fixed to a wall body through bolts; an upper end of the fixing mechanism 30 is clamped into the adjusting mechanism 40 and is able to slide along the adjusting mechanism 40 so as to drive the rat-proof plate body 10 to move, thereby realizing adjustment of an title angle; the rat-proof plate body 10 includes a first baffle plate 101 and a second baffle plate 102, wherein a bump 1011 is disposed on two side wall of the first baffle plate 101, and a concave groove 1021 is disposed on two sides of the second baffle plate 102 which are in contact with surfaces of the side walls of the first baffle plate 101; a size of the concave groove 1021 is matched with that of the bump 1011, and the bump 1011 is inserted into the concave groove 1021 so that the first baffle plate 101 is connected with the second baffle plate 102, wherein cross sections of the concave groove 1021 and the bump 1011 may be one of an isosceles trapezoid, a circle, an isosceles triangle, a square, and a rectangle; an embedding groove 1012 is disposed in one side surface of the first baffle plate 101 and one side surface of the second baffle plate 102, wherein the positioning rod 20 is clamped into the embedding groove 1012, so the first baffle plate 101 is fixed with the second baffle plate 102, so a user can select a suitable number of the first baffle plate 101 and the second baffle plate 102 according to the size of the door, and assemble them into the rat-proof plate body 10, so that the size of the rat-proof plate body 10 is matched with the size of the door, thereby avoiding that a door of a certain size can only be customized with a matching rat-proof plate, which causes waste of resources and increases mounting costs.

The adjusting mechanism 40 includes a locking pin 401 and an angle adjustment member 402, and two ends of the angle adjustment member 402 are fixedly provided with connecting lugs 4021 respectively, wherein circular holes 40211 for the bolts to pass through are formed in the connecting lugs 4021; the bolts penetrating through the circular holes 40211 to fix the connecting lugs 4021 to the wall body; the angle adjustment member 402 is internally provided with a slideway 4025, and a long-bar-shaped hole 4023 is formed in a side surface, close to the fixing mechanism 30, of the angle adjustment member 402, wherein the long-bar-shaped hole 4023 is communicated with the slideway 4025, and a size of the long-bar-shaped hole 4023 is smaller than that of the slideway 4025; a mounting hole 4024 is formed in one end of the long-bar-shaped hole 4023, and a positioning pin hole 4022 is formed in the side surface, close to the fixing mechanism 30, of the angle adjustment member 402, wherein the positioning pin hole 4022 is located above the long-bar-shaped hole 4023; the locking pin 401 penetrates through the fixing mechanism 30 and is inserted into the positioning pin hole 4022, thus the fixing mechanism 30 is connected with the angle adjustment member 402.

The fixing mechanism 30 includes a fixing plate 301 and a fixing base 302; a sliding wheel 3013 is fixedly arranged on a side surface, in contact with the angle adjustment member 402, of an upper end of the fixing plate 301, and a size of the sliding wheel 3013 is matched with that of the slideway 4025 and is smaller than that of the mounting hole 4024; the sliding wheel 3013 penetrates through the mounting hole 4024 and is embedded in the slideway 4025, thus pushing the fixing plate 301, therefor the sliding wheel 3013 on the fixing plate 301 is able to slide along the long-bar-shaped hole 4023 and drives the rat-proof plate body 10 to move with the fixing plate 301 so as to realize adjustment of a tilt angle of the rat-proof plate body 10; two connecting plates 3011 are vertically and fixedly arranged on a side surface of the fixing plate 301, and the two connecting plates 3011 are oppositely arranged along a long axis of the fixing plate 301, thus a space between the two connecting plates 3011 is reserved so that the rat-proof plate body 10 is able to insert into; a connecting column 3012 is fixedly arranged at ends, close to the ground, of the two connecting plates 3011, wherein the connecting column 3012 is located on non-adjacent side surfaces of the connecting plates 3011, and the fixing base 302 is sleeved on the connecting column 3012, therefor the fixing base 302 is able to rotate circumferentially along the connecting column 3012; the fixing base 302 includes a first connection plate 3021 and a second connection plate 3022, and the first connection plate 3021 is connected with the second connection plate 3022 by a pin shaft 3023, wherein a sleeve hole 30211 is arranged on a surface of the first connection plate 3021; the sleeve hole 30211 penetrates through the connecting column 3012 to connect the first connection plate 3021 with the connecting column 3012; a bolt hole 30221 for the bolt to pass through is disposed on a surface of the second connection plate 3022, and the bolt penetrates through the bolt hole 30221 to fix the second connection plate 3022 with the ground; when the sliding wheel 3013 on the fixing plate 301 slides along the slideway 4025, the first connection plate 3021 is able to rotate circumferentially along the pin shaft 3023.

Furthermore, the embedding groove 1012 and the positioning rod 20 are all provided with positioning holes 10121, and the bolts pass through the positioning holes 10121 to fix the positioning rod 20 with the rat-proof plate body 10.

Furthermore, a handle 1013 is fixedly disposed on upper end edges of the first baffle plate 101 and the second baffle plate 102, which are located on one side surface of the embedding groove 1012.

The upper end of the fixing mechanism 30 can slide along the adjusting mechanism 40 so as to drive the rat-proof plate body 10 to move, so that the tilt angle of the rat-proof plate body 10 is adjusted, forming a similar "∠" angle away from the room relative to the ground, so that the rats are prevented from climbing the device and entering the room.

Furthermore, an upper half of the rat-proof plate is bent toward the side away from the fixing mechanism, and is away from the fixing mechanism in the same direction as the tilt angle. Therefor, rats, snakes and other small animals can be efficiently blocked due to the fact that the upper half of the rat-proof plate is arranged in a curved surface.

Figure 8:
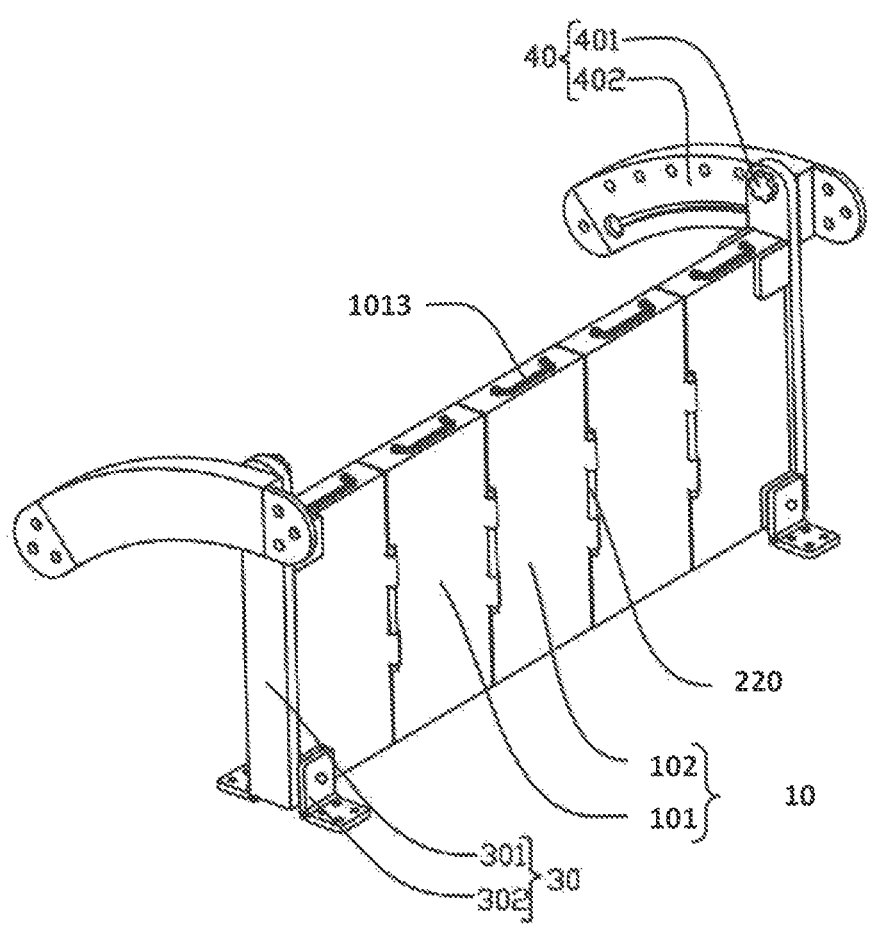
FIG. 8 is a schematic structural diagram of another rat-proof device according to an embodiment of the present invention.
Figure 9:
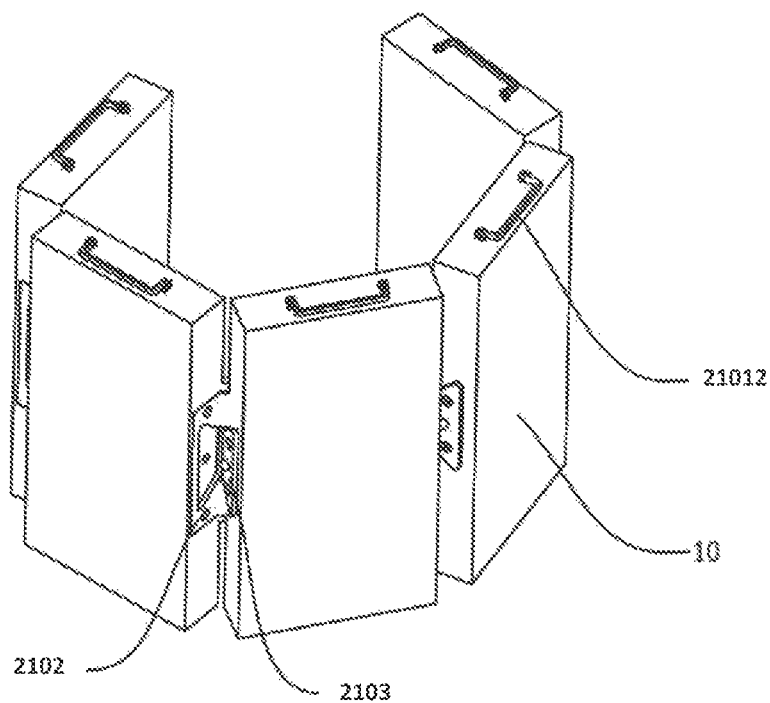
FIG. 9 is a schematic structural diagram of a rat-proof plate body of the rat-proof device in FIG. 8.
Figure 10:
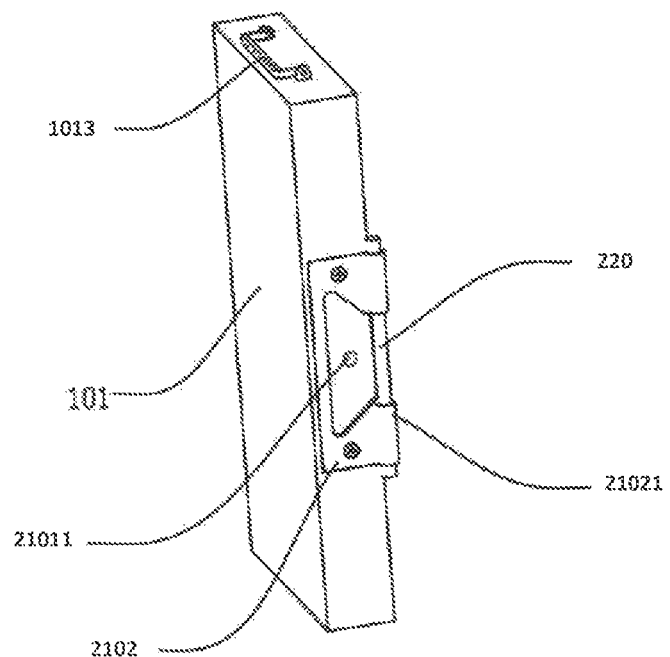
FIG. 10 is a schematic structural diagram of at least two rat-proof plates of the rat-proof device in FIG. 8.
Figure 11:
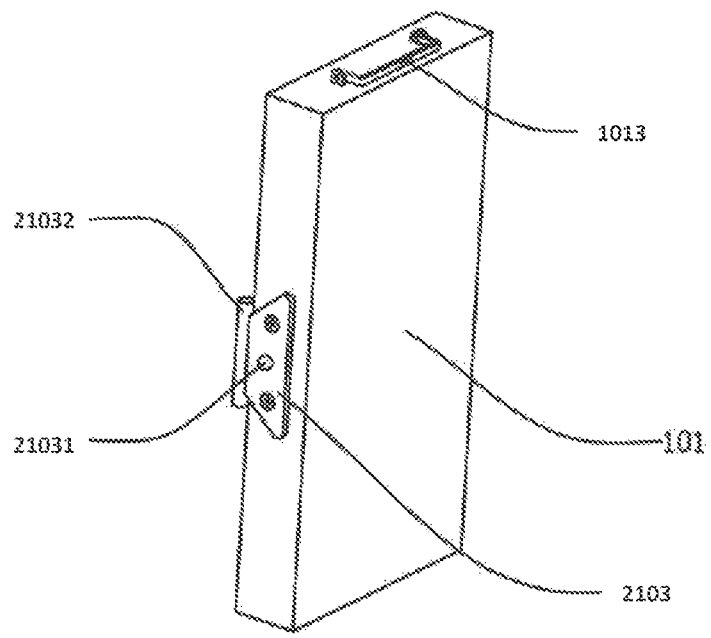
FIG. 11 is a schematic structural diagram of rat-proof plates of the rat-proof device in FIG. 8.

FIGS. 8-11 illustrate another tilt angle adjustable rat-proof device according to an embodiment of the present invention, including a rat-proof plate body 10, a fixing mechanism 30 and an adjusting mechanism 40, wherein a lower end of the fixing mechanism 30 is fixed with ground through bolts, and the fixing mechanism 30 is located on two sides of the rat-proof plate body 10; the rat-proof plate body 10 is inserted into the fixing mechanism 30 so that the rat-proof plate body 10 is clamped by the fixing mechanism 30, and a pin shaft 220 is embedded into the rat-proof plate body 10 and fixes the rat-proof plate body 10; the adjusting mechanism 40 is fixed to a wall body through bolts; an upper end of the fixing mechanism 30 is clamped into the adjusting mechanism 40 and is able to slide along the adjusting mechanism 40 so as to drive rat-proof plate body 10 to move, thereby realizing adjustment of a tilt angle of the rat-proof plate body 10, so a user is able to adjust the tilt angle of the rat-proof plate body 10 based on actual requirements during use, thereby adapting the use environment; the rat-proof plate body 10 includes at least two rat-proof plates, that is, a first rat-proof plate 101 and a second rat-proof plate 102, and at least two rat-proof plates are successively connected to each other through the pin shaft 220, and at least two rat-proof plates have the same structure, wherein the at least two rat-proof plates include a first rotating member 2102 and a second rotating member 2103; a mounting groove is formed in one side surface of the first baffle plate 101, and a magnetic hole 21011 for mounting the magnet is disposed at middle of a bottom of the mounting groove, and a handle 1013 is fixedly disposed on a top surface of the first baffle plate 101, so the user is able to carry, install and disassemble the first baffle plate 101 through the handle 1013; a size of the first rotating member 2102 is matched with that of the mounting groove, and the first rotating member 2102 is clamped into the mounting groove and is fixedly connected with the first baffle plate 101 by bolts; a gap is formed in the middle position of the first rotating member 2102, and two side edges along opening direction of the gap is provided with a first sleeve 21021; the second rotating member 2103 is fixed on one side surface of the first baffle plate 101 through bolts and is opposite to the first rotating member 2102, wherein a size of the second rotating member 2103 is matched with that of the gap arranged on the first rotating member 2102; the second rotating member 2103 is fixedly provided with a magnetic column head 21031, and a size of the magnetic column head 21031 is matched with that of the magnetic hole 21011, wherein one side edge of the second rotating member 2103 is fixedly provided with a second sleeve 21032, and the pin shaft 220 is inserted into the first sleeve 21021 and the second sleeve 21032, thus connecting the baffle plates 101 in sequence, and then the magnetic column head 21031 is inserted into the magnetic hole 21011, so the magnetic column head 21031 and the magnetic hole 21011 attract each other, fixing the baffle plates 101. So the user can select a suitable number of the baffle plates 101 according to the size of the door, and assemble them into the rat-proof plate body 10, so that the size of the rat-proof plate body 10 is matched with the size of the door, therefor the user does not need to customize the matched rat-proof plate for doors of different sizes, and only need to assemble the rat-proof plate body according to the size of the door; moreover, the user can fold the assembled rat-proof plate body, roll it up and roll it into a cylinder shape, so that the device is extremely convenient in the process of transportation and storage.

The adjusting mechanism 40 includes a locking pin 401 and an angle adjustment member 402, and two ends of the angle adjustment member 402 are fixedly provided with connecting lugs 4021 respectively, wherein circular holes 40211 for the bolts to pass through are formed in the connecting lugs 4021; the bolts penetrating through the circular holes 40211 to fix the connecting lugs 4021 to the wall body; the angle adjustment member 402 is internally provided with a slideway 4025, and a long-bar-shaped hole 4023 is formed in a side surface, close to the fixing mechanism 30, of the angle adjustment member 402, wherein the long-bar-shaped hole 4023 is communicated with the slideway 4025, and a size of the long-bar-shaped hole 4023 is smaller than that of the slideway 4025; a mounting hole 4024 is formed in one end of the long-bar-shaped hole 4023, and a positioning pin hole 4022 is formed in the side surface, close to the fixing mechanism 30, of the angle adjustment member 402, wherein the positioning pin hole 4022 is located above the long-bar-shaped hole 4023; the locking pin 401 penetrates through the fixing mechanism 30 and is inserted into the positioning pin hole 4022, thus the fixing mechanism 30 is connected with the angle adjustment member 402.

The fixing mechanism 30 includes a fixing plate 301 and a fixing base 302; a sliding wheel 3013 is fixedly arranged on a side surface, in contact with the angle adjustment member 402, of an upper end of the fixing plate 301, and a size of the sliding wheel 3013 is matched with that of the slideway 4025 and is smaller than that of the mounting hole 4024; the sliding wheel 3013 penetrates through the mounting hole 4024 and is embedded in the slideway 4025, thus pushing the fixing plate 301, therefor the sliding wheel 3013 on the fixing plate 301 is able to slide along the long-bar-shaped hole 4023 and drives the rat-proof plate body 10 to move with the fixing plate 301 so as to realize adjustment of a tilt angle of the rat-proof plate body 10; two connecting plates 3011 are vertically and fixedly arranged on a side surface of the fixing plate 301, and the two connecting plates 3011 are oppositely arranged along a long axis of the fixing plate 301, thus a space between the two connecting plates 3011 is reserved so that the rat-proof plate body 10 is able to insert into; a connecting column 3012 is fixedly arranged at ends, close to the ground, of the two connecting plates 3011, wherein the connecting column 3012 is located on non-adjacent side surfaces of the connecting plates 3011, and the fixing base 302 is sleeved on the connecting column 3012, therefor the fixing base 302 is able to rotate circumferentially along the connecting column 3012; the fixing base 302 includes a first connection plate 3021 and a second connection plate 3022, and the first connection plate 3021 is connected with the second connection plate 3022 by a pin shaft 3023, wherein a sleeve hole 30211 is arranged on a surface of the first connection plate 3021; the sleeve hole 30211 penetrates through the connecting column 3012 to connect the first connection plate 3021 with the connecting column 3012; a bolt hole 30221 for the bolt to pass through is disposed on a surface of the second connection plate 3022, and the bolt penetrates through the bolt hole 30221 to fix the second connection plate 3022 with the ground; when the sliding wheel 3013 on the fixing plate 301 slides along the slideway 4025, the first connection plate 3021 is able to rotate circumferentially along the pin shaft 3023.

The above-mentioned embodiments only express several implementation manners of the present disclosure, and their descriptions are more specific and detailed, but they cannot be understood as limiting the scope of the patent of the present disclosure. It should be pointed out those of ordinary skill in the art may further make a plurality of variations and improvements without departing from the concept of the present invention, and these all pertain to the protection scope of the present invention. Therefore, the protection scope of the claims shall prevail as the protection scope of the present invention.

What is claimed is:

1. A tilt angle adjustable combined rat-proof device, comprising a rat-proof plate body, a positioning rod, a fixing mechanism and an adjusting mechanisms, wherein a lower end of the fixing mechanism is fixed on a ground through a first set of bolts, and the fixing mechanism is located on both sides of the rat-proof plate body; the rat-proof plate body is inserted into the fixing mechanism so that the rat-proof plate body is clamped by the fixing mechanism; the positioning rod is embedded into the rat-proof plate body to fix the rat-proof plate body, and the adjusting mechanism is fixed to a wall body through a second set of bolts; an upper end of the fixing mechanism is clamped into the adjusting mechanism and is able to slide along the adjusting mechanism so as to drive the rat-proof plate body to move, thereby realizing adjustment of a tilt angle; the rat-proof plate body comprises a first baffle plate and a second baffle plate, wherein a bump is disposed on two side walls of the first baffle plate, and a concave groove is disposed on two side walls of the second baffle plate which are in contact with surfaces of the side walls of the first baffle plate; a size of the groove is matched with that of the bump, and the bump is inserted into the groove so that the first baffle plate is connected with the second baffle plate; an embedding groove is disposed in one side surface of the first baffle plate and one side surface of the second baffle plate, wherein the positioning rod is clamped into the embedding groove, so the first baffle plate is fixed with the second baffle plate.

2. The tilt angle adjustable combined rat-proof plate device according to claim 1, wherein the adjusting mechanism comprises a locking pin and an angle adjustment member, and two ends of the angle adjustment member are fixedly provided with connecting lugs, wherein circular holes for the second set of bolts to pass through are disposed in the connecting lugs; the second set of bolts penetrating through the circular holes to fix the connecting lugs to the wall body; the angle adjustment member is internally provided with a slideway, and a long-bar-shaped hole is formed in a side surface, close to the fixing mechanism, of the angle adjustment member, wherein the long-bar-shaped hole is communicated with the slideway, and a size of the long-bar-shaped hole is smaller than a size of the slideway; a mounting hole is formed in one end of the long-bar-shaped hole, and a positioning pin hole is formed in the side surface, close to the fixing mechanism, of the angle adjustment member, wherein the positioning pin hole is located above the long-bar-shaped hole; the locking pin penetrates through the fixing mechanism and is inserted into the positioning pin hole, thus the fixing mechanism is connected with the angle adjustment member.

3. The tilt angle adjustable combined rat-proof device according to claim 2, wherein the fixing mechanism comprises a fixing plate and a fixing base; a sliding wheel is fixedly arranged on a side surface, in contact with the angle adjustment member, of an upper end of the fixing plate, and a size of the sliding wheel is matched with the size of the slideway and is smaller than a size of the mounting hole; the sliding wheel is embedded in the slideway and is able to slide along the long-bar-shaped hole; two connecting plates are vertically and fixedly arranged on a side surface of the fixing plate, and the two connecting plates are oppositely arranged along a long axis of the fixing plate, thus the rat-proof plate body is inserted into a space between the two connecting plates; a connecting column is fixedly arranged on a surface of one end close to the ground of the connecting plate and one side away from the rat-proof plate body of the connecting plate, and the fixing base is sleeved on the connecting column, therefor the fixing base is able to rotate circumferentially along the connecting column.

4. The tilt angle adjustable combined rat-proof device according to claim 3, wherein the fixing base comprises a first connection plate and a second connection plate, and the first connection plate is connected with the second connection plate by a pin shaft, wherein a sleeve hole is arranged on a surface of the first connection plate; the sleeve hole penetrates through the connecting column to connect the first connection plate with the connecting column; bolt holes for the first set of bolts to pass through are disposed on a surface of the second connection plate, and the first set of bolts penetrate through the bolt holes to fix the second connection plate, thereby fixing the fixing base.

5. The tilt angle adjustable combined rat-proof device according to claim 1, wherein the embedding groove and the positioning rod are each provided with positioning holes, and a third set of bolts pass through the positioning holes to fix the positioning rod and the rat-proof plate body.

6. The tilt angle adjustable combined rat-proof device according to claim 1, wherein a handle is fixedly disposed on upper end edges of the first baffle plate and the second baffle plate, which is located on one side surface of the embedding groove.

7. The tilt angle adjustable combined rat-proof device according to claim 1, wherein an upper half of the rat-proof plate is bent toward a side away from the fixing mechanism.

8. A tilt angle adjustable combined rat-proof device, comprising a rat-proof plate body, a fixing mechanism and an adjusting mechanism, wherein a lower end of the fixing mechanism is fixed on a ground through a first set of bolts, and the fixing mechanism is located on two sides of the rat-proof plate body; the rat-proof plate body is inserted into the fixing mechanism so that the rat-proof plate body is clamped and fixed by the fixing mechanism; the adjusting mechanism is fixed to a wall body through a second set of bolts; an upper end of the fixing mechanism is clamped into the adjusting mechanism and is able to slide along the adjusting mechanism so as to drive the rat-proof plate body to move, thereby realizing adjustment of a tilt angle of the rat-proof plate body; the rat-proof plate body includes at least two rat-proof plates, and at least two rat-proof plates are successively connected to each other through a pin shaft, and at least two rat-proof plates have a same structure, wherein the at least two rat-proof plates comprise baffle plates, a first rotating member and a second rotating member; a mounting groove is formed in one side surface of the baffle plates, and a magnetic hole for mounting a magnet is disposed at a middle of a bottom of the mounting groove, wherein a size of the first rotating member is matched with a size of the mounting groove, and the first rotating member is clamped into the mounting groove and is fixedly connected with the baffle plates by a forth set of bolts; a gap is formed in a middle position of the first rotating member, and two side edges along an opening direction of the gap is provided with a first sleeve; the second rotating member is fixed on one side surface of the baffle plates through a fifth set of bolts and is opposite to the first rotating member, wherein a size of the second rotating member is matched with a size of the gap arranged on the first rotating member; the second rotating member is fixedly provided with a magnetic column head, and a size of the magnetic column head is matched with that of the magnetic hole, wherein one side edge of the second rotating member is fixedly provided with a second sleeve, and the pin shaft is inserted into the first sleeve and the second sleeve, thus connecting the baffle plates in sequence, and the magnetic column head is inserted into the magnetic hole, so the magnetic column head and the magnetic hole attract each other, fixing the baffle plates.

9. The tilt angle adjustable folding rat-proof device according to claim 8, wherein the adjusting mechanism comprises a locking pin and an angle adjustment member, and two ends of the angle adjustment member are fixedly provided with connecting lugs respectively, wherein circular holes for the second set of bolts to pass through are formed in the connecting lugs; the second set of bolts penetrating through the circular holes to fix the connecting lugs to the wall body; the angle adjustment member is internally provided with a slideway, and a long-bar-shaped hole is formed in a side surface, close to the fixing mechanism, of the angle adjustment member, wherein the long-bar-shaped hole is communicated with the slideway, and a size of the long-bar-shaped hole is smaller than a size of the slideway; a mounting hole is formed in one end of the long-bar-shaped hole, and a positioning pin hole is formed in the side surface, close to the fixing mechanism, of the angle adjustment member, wherein the positioning pin hole is located above the long-bar-shaped hole; the locking pin penetrates through the fixing mechanism and is inserted into the positioning pin hole, thus the fixing mechanism is connected with the angle adjustment member.

10. The tilt angle adjustable folding rat-proof device according to claim 9, wherein the fixing mechanism comprises a fixing plate and a fixing base; a sliding wheel is fixedly arranged on a side surface, in contact with the angle adjustment member, of an upper end of the fixing plate, and a size of the sliding wheel is matched with the size of the slideway and is smaller than a size of the mounting hole; the sliding wheel is embedded in the slideway and is able to slide along the long-bar-shaped hole; two connecting plates are vertically and fixedly arranged on a side surface of the fixing plate, and the two connecting plates are oppositely arranged along a long axis of the fixing plate, thus the rat-proof plate body is inserted into a space between the two connecting plates; a connecting column is fixedly arranged on a surface of one end close to the ground of the connecting plate and one side away from the rat-proof plate body of the connecting plate, and the fixing base is sleeved on the connecting column, therefor the fixing base is able to rotate circumferentially along the connecting column.

11. The tilt angle adjustable folding rat-proof device according to claim 10, wherein the fixed base comprises a first connection plate and a second connection plate, and the first connection plate is connected with the second connection plate by a pin shaft, wherein a sleeve hole is arranged on a surface of the first connection plate; the sleeve hole penetrates through the connecting column to connect the first connection plate with the connecting column; bolt holes for the first set of bolts to pass through are disposed on a surface of the second connection plate, and the first set of bolts penetrate through the bolt holes to fix the second connection plate, thereby fixing the fixing base.

\* \* \* \* \*